United States Patent [19]

Allain

[11] Patent Number: 5,405,287
[45] Date of Patent: Apr. 11, 1995

[54] METHOD AND APPARATUS FOR PROCESSING SHRIMP

[75] Inventor: Reid Allain, Marietta, Ga.

[73] Assignee: Robert B. Kennedy, Atlanta, Ga. ; a part interest

[21] Appl. No.: 179,661

[22] Filed: Jan. 11, 1994

[51] Int. Cl.⁶ ............................................. A22C 29/02
[52] U.S. Cl. ........................................ 452/4; 452/64; 452/166
[58] Field of Search ...................... 452/4, 2, 64, 166

[56] References Cited

U.S. PATENT DOCUMENTS

| | | | |
|---|---|---|---|
| 1,677,579 | 7/1928 | Barry | 452/2 |
| 3,932,914 | 1/1976 | Lapeyre | 452/2 |
| 4,016,625 | 4/1977 | Mitchell | 452/4 |
| 4,531,261 | 7/1985 | Sanaka | 452/4 |
| 4,916,776 | 4/1990 | Allain | 452/4 |

*Primary Examiner*—Willis Little
*Attorney, Agent, or Firm*—Kennedy & Kennedy

[57] ABSTRACT

A method and apparatus (10) are disclosed for deheading shrimp. The apparatus has grasping means (18) for grasping shrimp positioned upon a support plate (17) and rotating the shrimp to an upright position adjacent a deheading station (14). The deheading station has a pinch block (19) having an elongated edge (46) and a pinch plate (20) which is moved closely past the pinch block. The body of the shrimp is pulled from the head as the shrimp is pinched between the pinch block and the moving pinch plate.

22 Claims, 4 Drawing Sheets

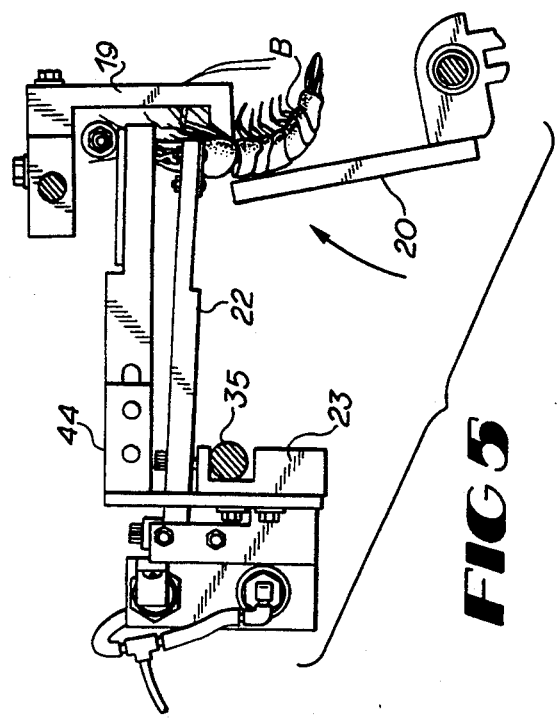
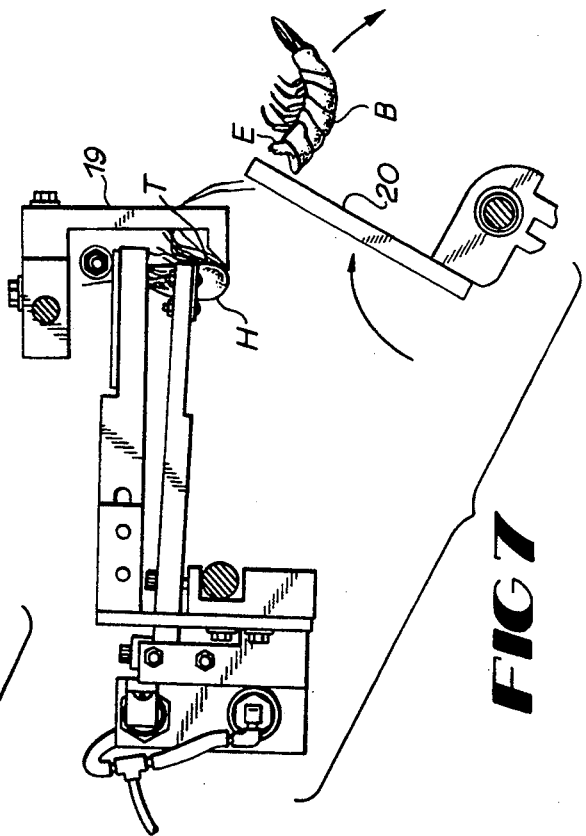
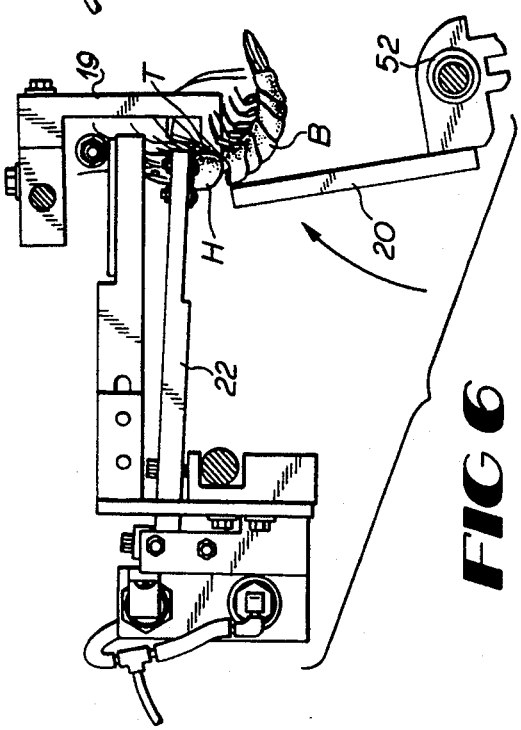

METHOD AND APPARATUS FOR PROCESSING SHRIMP

TECHNICAL FIELD

This invention relates to methods and apparatuses for processing crustaceans, and more particularly to methods and apparatuses for deheading shrimp on an automated basis.

BACKGROUND OF THE INVENTION

Once shrimp are caught and removed from water they must be deheaded within a relatively short period of time or frozen whole to delay the decaying action of bacteria within the head. Heretofore, shrimp have been deheaded by manually pulling the head from the body of the shrimp. This process however is labor intensive and time consuming.

Automated apparatuses have been designed for deheading shrimp as shown in U.S. Pat. No. 4,692,965. These apparatuses dehead shrimp by bending the shrimp quickly around an edge as they move from a vertical tube of slow moving fluid to a horizontal tube of fast moving fluid. However, because the orientation of the shrimp is not consistent, as well as other variables involving the force required to dehead shrimp, these apparatuses do not always dehead the shrimp. Furthermore, the separated heads and bodies of the shrimp are conveyed within the same stream of fluid, thus requiring further separation of these portions.

Shrimp deheading apparatuses have also been designed which have a blade which severs the head from the body, as shown in U.S. Pat. No. 4,016,625. However, due to differences in the size of shrimp these apparatuses sometimes sever within the head thus causing portions of the head to remain attached to the body. Conversely, the shrimp are sometimes severed within the body thus causing a portion of the body meat of the shrimp to remain attached to the head and therefore wasted. Also, even when a shrimp is severed properly between the head and body, a portion of the body meat which extends into the head is severed from the body and discarded with the head, thereby causing that portion to be wasted. These situations obviously cause inefficiencies and increases in the overall cost of processed shrimp.

Shrimp deheading apparatuses have also designed which remove the head by "pinching" it from the body, as shown in U.S. Pat. No. 4,941,233. A problem however occurred with the proper positioning of the shrimp immediately prior to the pinching action. Oftentimes, differences in the natural curvature of shrimp causes shrimp to be oriented at different angles as they are pinched between a deheading finger and a deheading block. It has been found that a consistent orientation of the shrimp is an important factor in properly removing the head and optimizing the recovery of shrimp meat within the head.

Accordingly, it is seen that a need has long existed for methods and apparatuses for deheading shrimp in a commercially efficient and effective manner. It is to the provision of such methods and apparatuses therefore that the present invention is primarily directed.

SUMMARY OF THE INVENTION

In a preferred form of the invention an apparatus for processing shrimp comprises means for conveying shrimp in sequence to a deheading station one behind the other. The apparatus includes a pair of rails with an elongated gap therebetween and means for grasping the head of the shrimp for positioning them in a generally upright orientation. The apparatus also has means for separating the shrimp body from the head as it is grasped by the grasping means.

With the method of deheading shrimp their heads are grasped so that an edge of one member of a pinch device is positioned against the anterior of the shrimp behind the shrimp head and thoracic plate. Another member of the pinch device is moved into engagement with the back of the shrimp and past the one pinch member thereby removing the body meat from within the head in tact with the body, and separating the body from the head and thoracic plate.

BRIEF DESCRIPTION OF THE DRAWING

FIGS. 2–7 are a sequence of side elevational views of operative portions of the apparatus of FIG. 1 showing a shrimp sequentially being grasped, rotated into position and deheaded.

DETAILED DESCRIPTION

Figure 1:
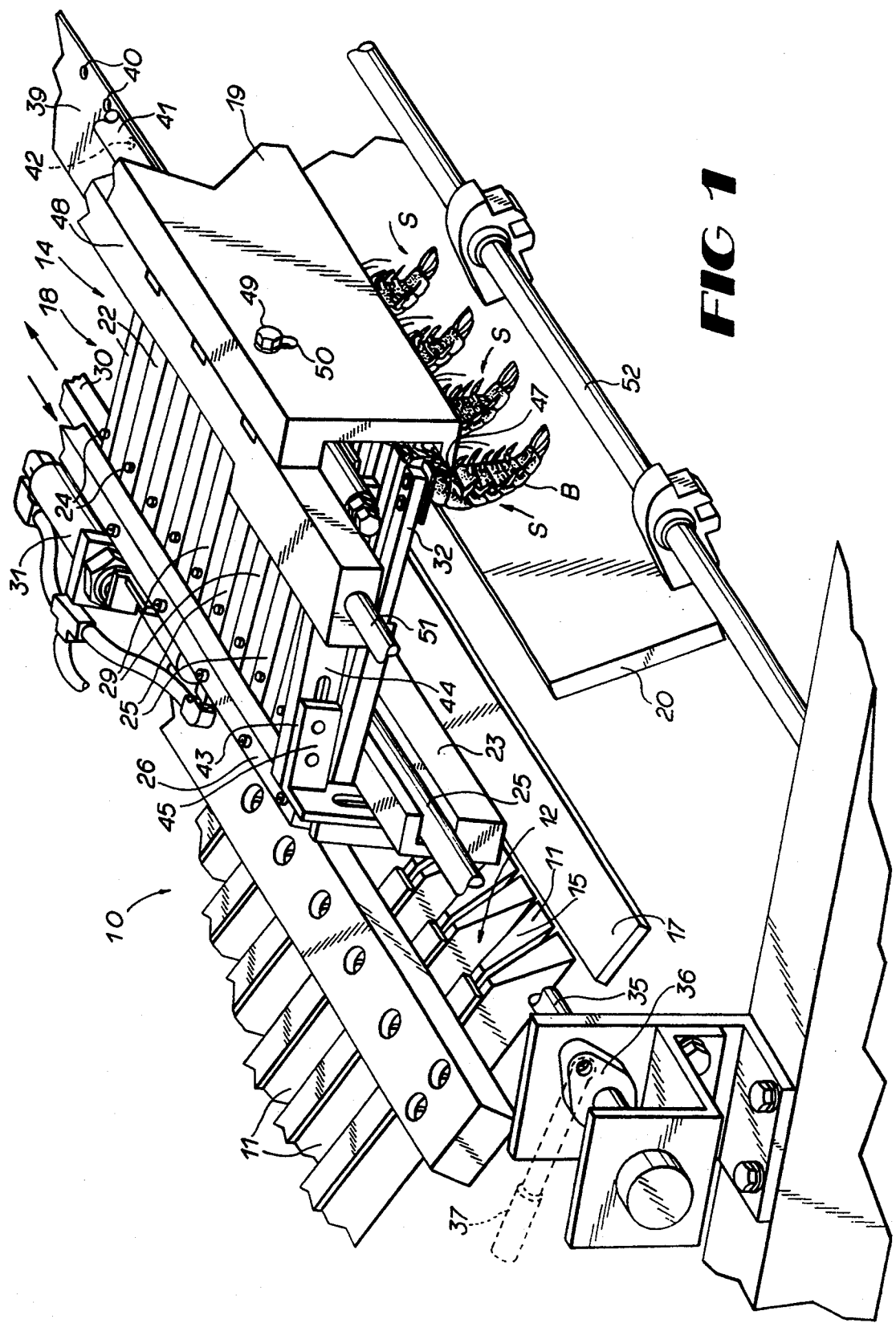
FIG. 1 is a perspective view of a portion of a shrimp processing apparatus that embodies principles of the invention in a preferred form and which may be used in practicing the inventive method.

With reference next to the drawing, there is shown a shrimp processing apparatus 10 having multiple pairs of inverted V-shaped rails 11 that extend lengthwise in side by side relation to form V-shaped channels 12 therebetween. Apparatus 10 is similar in basic construction and revolving actuation of the rails to that described in detail in U.S. Pat. No. 4,941,233. The apparatus 10 has a deheading station 14 positioned adjacent an exit ends 15 of the rails 11. At the deheading station 14 is located a support plate 17, reciprocating grasping means 18, a U-shaped, reciprocating pinch block 19 and a reciprocating pinch plate 20.

The grasping means 18 has multiple pairs of elongated grasping members 22 pivotable mounted to a mounting bar 23 by pivot pins 24. One grasping member 25 of each pair of member is pivotably mounted at one end to an actuation bar 26 by a pivot pin 27. The other grasping member 29 of each pair of members 22 is pivotably mounted at one end to another actuation bar 30 in like manner. An air solenoid 31 is coupled to the actuation bars 26 and 30 so as to move them in opposite directions, as indicated by the arrows in FIG. 1, to bring the grasping ends 32 of the grasping members towards and away from each other.

Figure 2:
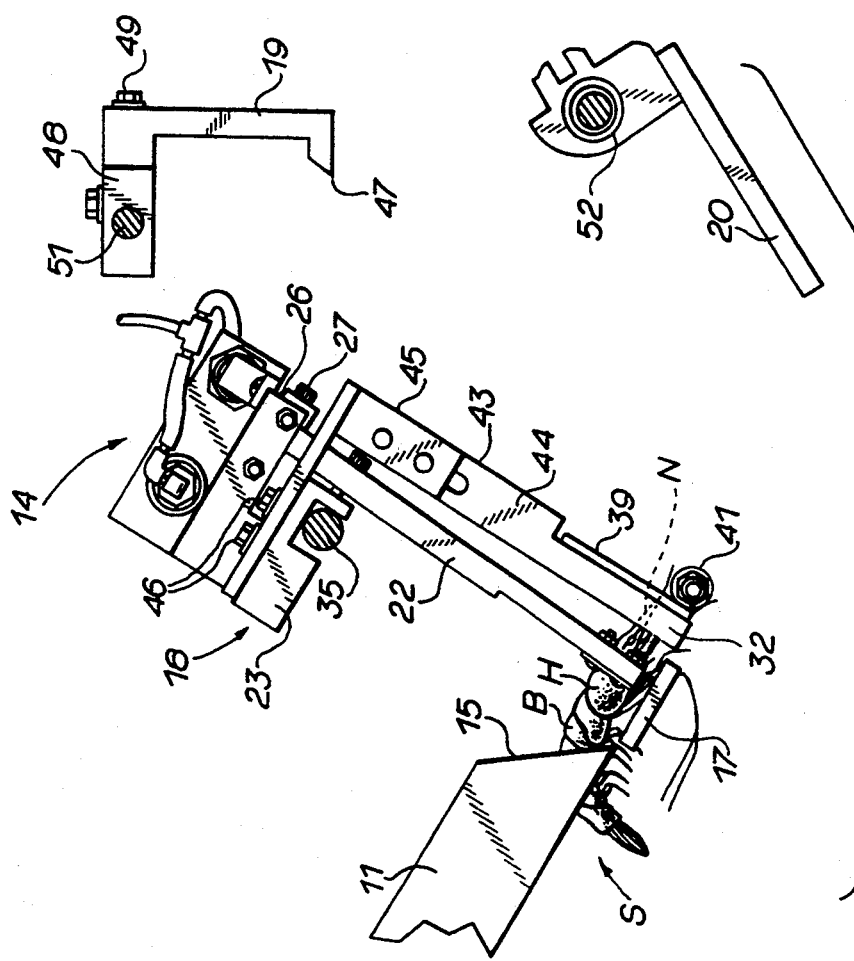

The mounting bar 23 is secured to a pivot rod 35 having a collar 36 coupling the pivot bar 35 to an air solenoid 37, shown in phantom lines for clarity of explanation, for reciprocally moving the grasping members 22 between a lower position adjacent the support plate 17, as shown in FIG. 2, and an upper position adjacent the pinch block 19, as shown in FIG. 1. The grasping means 18 also has a stop plate 39 having a series of holes 40 therethrough aligned between the grasping members of each pair of grasping members 22. It further has a liquid supply line 41 with nozzles 42 aligned to direct streams of liquid through holes 40 and between the grasping members 22. The stop plate 39 and liquid supply line 41 are mounted at each end to the mounting bar 23 through adjustable couplers 43. Each coupler 43 has a lower member 44 adjustably coupled to an upper member 45 which in turn is adjustably coupled to the mounting bar 23 by bolts 46, the function of the adjustability being described in detail hereinafter.

Figure 3:
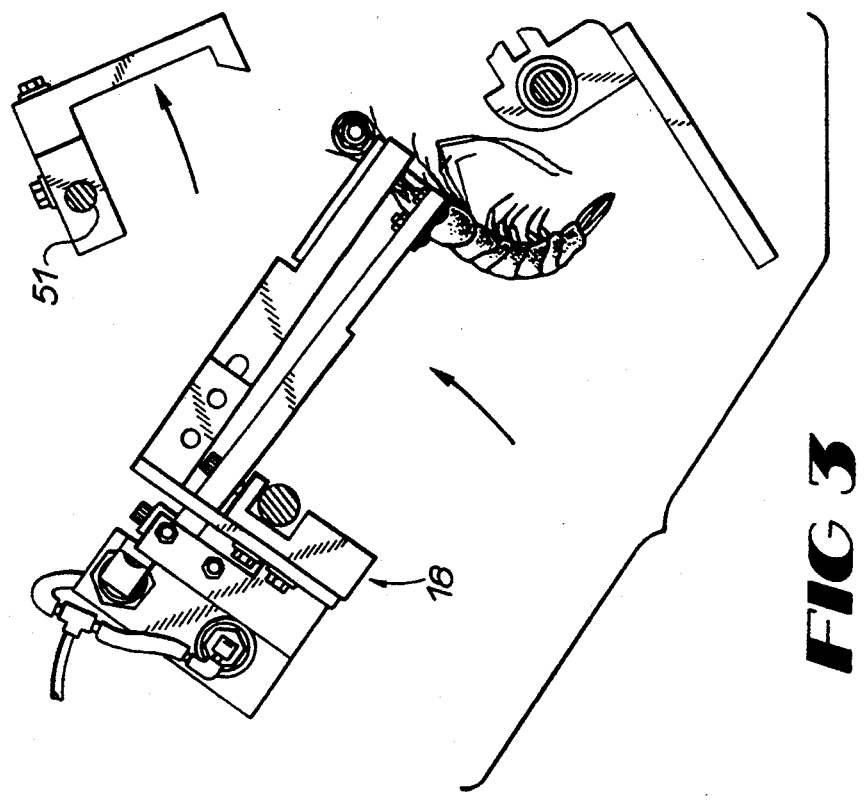

The pinch block 19 has an edge 47 extending along its length. The block is adjustably mounted to an elongated member 48 by set bolts 49 extending through elongated slots 50 in the pinch block. The elongated member 48 is rigidly mounted to a pivot rod 51 extending therethrough which in turn is mounted to an unshown air solenoid which rotates pivot rod 51 and pinch block 19 so as to reciprocally move the block edge 47 between a deheading position, as shown in FIG. 2, and a retracted position, as shown in FIG. 3. The pinch plate 20 is also mounted to an air solenoid actuated pivot rod 52 which reciprocally moves the pinch plate 20 closely past the pinching block 19.

In use, shrimp S positioned upon the rails 11 travel within channels 12 towards the exit end 15 of the rails. Preferably, this travel is induced by the means described in the aforementioned U.S. Pat. No. 4,941,233. As shown in FIG. 2, as a shrimp S exits the channels it comes to rest upon the support plate 17 with its horn N abutting stop plate 39. The grasping members 25 and 29 are then forced toward each other by moving actuation bars 26 and 30 in opposite directions by actuation of solenoid 31. The gripping ends 32 of the grasping members grasp the head H of the shrimp therebetween. Grasping the shrimp head while it is at rest upon the support plate 17 insures that shrimp are grasped in substantially the same orientation.

Figure 4:
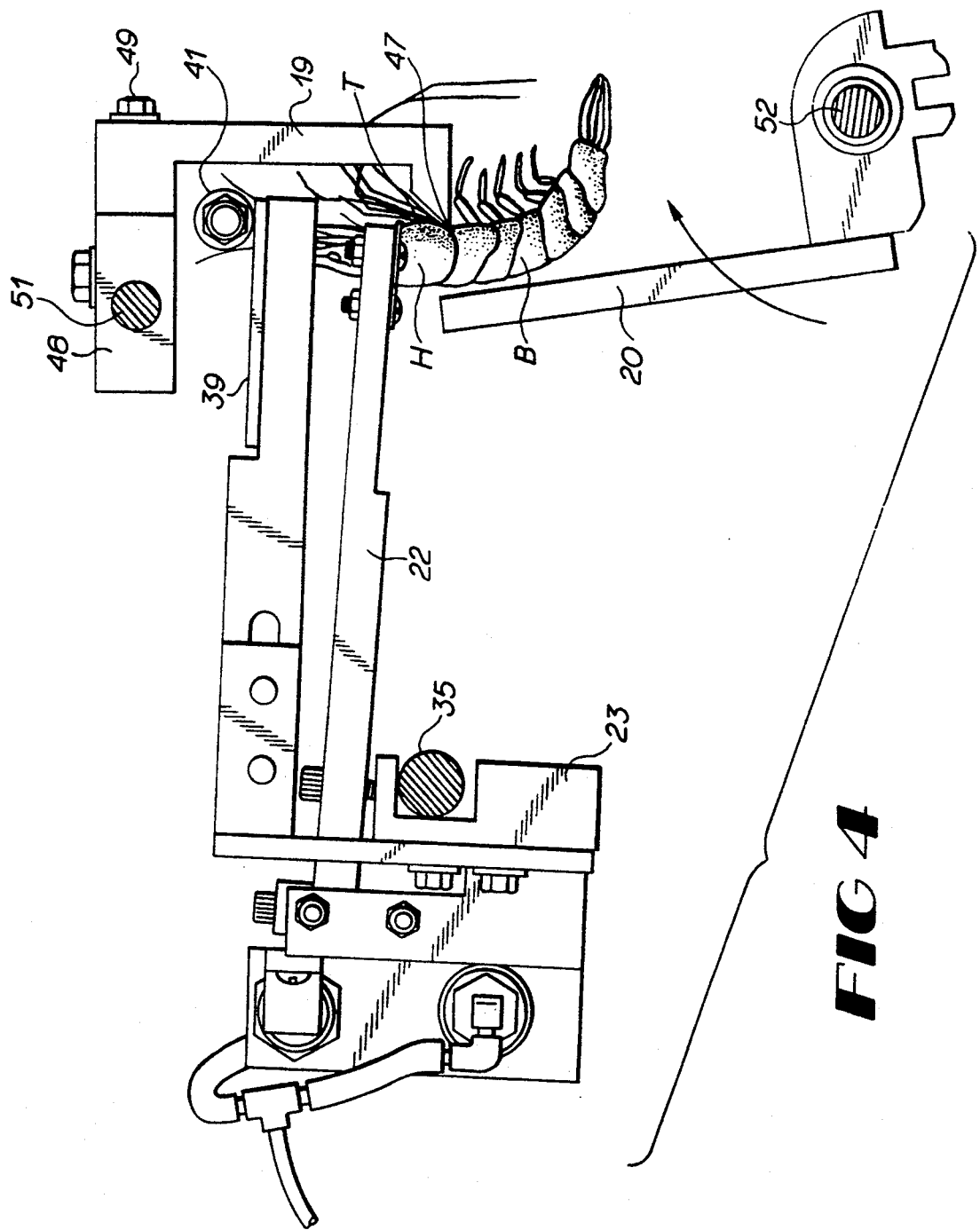

With reference next to FIG. 3, solenoid 37 is next actuated so as to rotate the grasping means 18 counterclockwise to its upper position. Simultaneously, pinching block 19 is rotated counterclockwise by the rotation of the solenoid actuated pivot rod 51 to allow for clearance between the rotating grasping means 18 and the pinching block 19. The pinching block is then rotated clockwise to its initial position. The shrimp S is now positioned with its head generally upright and with the elongated edge 47 of the pinch block located immediately below the head H and the thoracic plate T of the shrimp, as best shown in FIG. 4. Next, the pinching plate 20 is rotated clockwise whereupon it moves into contact with the dorsal of the shrimp body B immediately below the head H. As shown in FIG. 5, as the pinching plate 20 contacts the shrimp its body B commences to separate from the grasped head H while the edge 47 of pinch block 19 is forced into the shrimp below the thoracic plate T. Continued rotation of the pinching plate 20 pulls and separates the extra portion of the body meat E contained beneath the shell of the head from the head itself, thus saving it from being wasted. Finally, the pinching plate 20 moves past the pinching block 19 thus completely separating the body B from the head H and depositing the body B in an unshown collection bin.

Once the shrimp is deheaded, the pinching plate 20 is rotated counterclockwise to its initial position by rotation of pivot rod 52. The grasping ends 32 of grasping members 25 and 29 are then actuated away from each other by solenoid 37 to release the shrimp heads H. A stream of fluid is also directed by nozzles 42 through holes 40 to wash the head from the grasping members and into an unshown collection trough. The shrimp heads are released in this manner as the pinching block 19 is once again rotated for clearance and the grasping means 18 is rotated to its initial position adjacent the rails 15, thus completing one cycle of operation.

The stop plate 39 and liquid supply line 41 may be moved to different positions relative to the grasping members 22 by simply loosening bolts 46, sliding the upper member 45 to the desired position and retightening the bolts 46. This enables the grasping means 18 to be adjusted for different sized shrimp. For example, for large shrimp the stop plate 39 is moved distally from the grasping members 22, while with small shrimp the stop plate is positioned close to the grasping members. The coupler lower member 44 and upper member 45 may also be moved to different positions relative to each other to adjust the position of the stop plate holes 40 and nozzles 42. The nozzles are positioned according to the size of the shrimp so as to effectively wash the shrimp heads from the grasping means.

It thus is seen that a method and apparatus is now provided for processing shrimp on an automated basis which overcomes problems long associated with those of the prior art. It should however be understood that the just described embodiment merely illustrates principles of the invention in its preferred form. Many modifications, additions and deletions may, of course, be made thereto without departure from the spirit and scope of the invention as set forth in the following claims.

I claim:

1. Apparatus for processing shrimp comprising means for conveying shrimp to a deheading station in sequence one behind the other that includes a pair of rails with an elongated gap therebetween, means for supporting shrimp upon the anterior of the head and thoracic plate while between said rails, means for grasping the head of the shrimp while supported upon said support means, rotating means for rotating said grasping means from an initial position grasping the shrimp to a delivery position with the shrimp in a generally upright orientation with the shrimp body depending downward from the head, and means for separating the shrimp body from the grasped head that includes a pinch block having an edge positioned for engagement with the anterior of the grasped shrimp between the thoracic plate and the body and a pinch plate mounted for movement along a path of travel adjacent to said pinch plate edge and into contact with the posterior of the shrimp body.

2. The apparatus of claim 1 wherein said grasping means includes means for rotating said grasping means so as to position the shrimp adjacent said separating means.

3. The apparatus of claim 1 wherein said grasping means is comprised of a pair of elongated members pivotably mounted so as to grasp the shrimp head therebetween.

4. The apparatus of claim 3 wherein said grasping means further includes a stop plate mounted adjacent said elongated members for positioning the shrimp for grasping by abutting engagement of the shrimp horn.

5. The apparatus claim 3 further comprising a water nozzle oriented to generate a stream of water directed between said elongated members.

6. Apparatus for deheading shrimp comprising conveying means that includes a pair of rails with an elongated gap therebetween, support means for supporting shrimp upon the anterior of the head and thoracic plate of the shrimp while positioned within said gap of said rails, grasping means for grasping the head of the shrimp while the shrimp is supported upon said support means, rotating means for rotating the grasped shrimp to a position wherein it is oriented generally vertical with the shrimp body depending downward from the head, and deheading means for deheading the shrimp while oriented generally vertically that includes a pinch plate mounted for movement into contact with the posterior of the shrimp body without contacting the shrimp head.

7. The apparatus of claim 6 wherein said grasping means comprises a pair of elongated members pivotable mounted so as to grasp the shrimp head therebetween.

8. The apparatus of claim 7 wherein said grasping means further includes a stop plate mounted adjacent said elongated members for abutment with the horn of the shrimp.

9. The apparatus of claim 6 wherein said deheading means further comprises a pinch block having an elongated edge positionable between the thoracic plate and the body of a shrimp and adjacent the path of travel of said pinch plate edge.

10. The apparatus of claim 7 further comprising a water nozzle oriented to generate a stream of water directed between said elongated members.

11. In an apparatus for conveying shrimp for processing having a pair of rails rigidly mounted together side by side and spaced apart a distance to support shrimp in an elongated gap therebetween and means for revolving at least a portion of said rails in an upright plane, the improvement comprising a support means mounted adjacent said rails for supporting the shrimp positioned upon the anterior of the shrimp head and thoracic plate while also positioned between the rails, means for grasping the shrimp while supported upon said support means, means for rotating the grasped shrimp to a position wherein its head is vertically oriented with its body depending downward from the head, and means for deheading shrimp at a deheading station adjacent said rails and which includes a pinch block having an edge and a pinch plate mounted for movement along a path of travel adjacent to said pinch plate edge.

12. The improvement of claim 11 wherein said grasping means is comprised of a pair of elongated members pivotably mounted so as to grasp the shrimp head therebetween.

13. The improvement of claim 12 wherein said grasping means further includes a stop plate mounted adjacent said elongated members for abutment with the horn of the shrimp.

14. The improvement claim 12 further comprising a water nozzle oriented to generate a stream of water directed between said elongated members.

15. A method of deheading shrimp which comprises the steps of:
(a) supporting the shrimp upon the anterior of the head and thoracic plate of the shrimp;
(b) grasping the head of the shrimp;
(c) rotating the shrimp to a position with the shrimp positioned generally upright with its body depending downward from its head;
(d) positioning an edge of one member of a pinch device against the anterior of the shrimp behind the shrimp head and thoracic plate; and
(e) moving another member of the pinch device into engagement with the back of the body of the shrimp and past the one pinch member thereby removing the body meat from within the head in tact with the body and separating the body from the head and thoracic plate.

16. The method of claim 15 wherein opposite sides of the shrimp head are grasp.

17. A method of processing shrimp which comprises the steps of:
(a) conveying the shrimp onto a support with the shrimp supported upon the anterior of the head and thoracic plate of the shrimp;
(b) grasping opposite sides of the shrimp head while it is supported upon its anterior;
(c) reorienting the shrimp to a generally upright position with its body depending downward from the head of the shrimp;
(d) positioning the shrimp adjacent a pinch block; and
(e) disjoining the head of the shrimp by moving a pinch plate into contact with the posterior of the body of the shrimp and closely past the pinch block.

18. The method of claim 17 wherein the head of the shrimp is grasped with two elongated members pivotably mounted so as to grasp the shrimp therebetween.

19. Apparatus for deheading shrimp comprising means for supporting a shrimp upon the anterior of the head and thoracic plate of the shrimp, means for grasping opposite sides of a shrimp head; and pinch means that includes a first pinch member with an edge, means for positioning said first pinch member edge at a position to engage the anterior of a shrimp grasped by said grasping means behind the shrimp head and thoracic plate, a second pinch member, and means for moving said second pinch member past said first pinch member edge-and into contact with the posterior of the shrimp behind the shrimp head and thoracic plate.

20. The apparatus of claim 19 wherein said grasping means is comprised of a pair of elongated members pivotably mounted so as to grasp the shrimp head therebetween.

21. The apparatus of claim 20 wherein said grasping means further includes a stop plate mounted adjacent said elongated members for positioning the shrimp for grasping by contact with the horn of the shrimp.

22. The apparatus claim 20 further comprising a water nozzle oriented to generate a stream of water directed between said elongated members.

* * * * *